US006763497B1

(12) United States Patent
Softky

(10) Patent No.: US 6,763,497 B1
(45) Date of Patent: Jul. 13, 2004

(54) METHOD AND APPARATUS FOR DISPLAYING COMPUTER PROGRAM ERRORS AS HYPERTEXT

(75) Inventor: William R. Softky, Menlo Park, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/559,123

(22) Filed: Apr. 26, 2000

(51) Int. Cl.[7] .............................................. G06F 17/00
(52) U.S. Cl. .................... 715/501.1; 715/531; 715/517; 717/125; 717/129
(58) Field of Search ............................. 715/501.1, 531, 715/517; 717/125, 129, 124; 345/342; 714/48, 38

(56) References Cited

U.S. PATENT DOCUMENTS

| | | | |
|---|---|---|---|
| 5,204,947 A | 4/1993 | Bernstein et al. ........... 395/157 |
| 5,657,463 A | 8/1997 | Bingham ..................... 395/342 |
| 5,694,539 A | 12/1997 | Haley et al. | |
| 5,790,778 A | 8/1998 | Bush et al. | |
| 5,806,077 A | 9/1998 | Wecker ....................... 707/501 |
| 5,806,079 A | 9/1998 | Rivette et al. ............... 707/512 |
| 5,845,120 A | * 12/1998 | Reddy et al. ................ 717/125 |
| 5,856,826 A | 1/1999 | Craycroft ..................... 345/346 |
| 5,963,206 A | * 10/1999 | Ulrich et al. ................ 345/788 |
| 5,974,568 A | * 10/1999 | McQueen ..................... 714/38 |
| 6,427,232 B1 | * 7/2002 | Ku et al. ..................... 717/124 |

OTHER PUBLICATIONS

Bush, W.R., et al., "A Static Analyzer for Finding Dynamic Programming Errors", Intrinsa Corporation, Mountain View, CA USA, 1–16.

Zellweger, P.T., et al., "Fluid Links for Informed and Incremental Link Transistions", *Proceedings of Hypertext '98*, Pittsburgh, PA, Jun. 20–24, 1998, pp. 50–57., 1–8.

* cited by examiner

Primary Examiner—Joseph Feild
Assistant Examiner—James H Blackwell
(74) Attorney, Agent, or Firm—Merchant & Gould

(57) ABSTRACT

According to one embodiment a method and apparatus for displaying the path of a computer program error as a sequence of hypertext documents in a computer system having a display is disclosed. The method includes displaying a first function in the control-flow path of the error as text in a first region on the display. Subsequently, a first hypertext link marker located within the first function, and associated with a second function called by the first and also lying on the error's control-flow path is selected. Thereafter, the second function's text associated with the first link marker is displayed in a second region. The second region is positioned in the first region such that the text of the first document is not obscured. The second region includes a first tab area that surrounds the first link maker after it is selected. According to a further embodiment, the method also includes selecting a second hypertext link marker located within the second function, corresponding to a third function called by the second and lying on the error's control-flow path. Afterwards, the text of the third function associated with the second link marker is displayed in a third region. The third region is positioned in the second region such that the text of the second document is not obscured.

16 Claims, 15 Drawing Sheets

Warning 5: freeing pointer to already-freed memory 'this->head->next'
Location: C:/ My Progs/Src/jdp.cpp(52)
Function: OMScriptableObject:: doitTwice (void)

```
49   void OMScriptableObject::doitTwice (void)
50   {
51       addProp (new OMProp ("name1"));
52       addProp (new OMProp ("name2"));
53   }
```

Warning 5: freeing pointer to already-freed memory 'this->head->next'
Location: C:/ My Progs/Src/jdp.cpp(52)
Function: OMScriptableObject::doitTwice (void)

49  void OMScriptableObject::doitTwice (void)
50  {
51      addProp (new OMProp ("name1"));
52      addProp (new OMProp ("name2"));
53  }
         613              617

```
Warning 5: freeing pointer to already-freed memory 'this->head->next'
Location: C:/ My Progs/Src/jdp.cpp(52)
Function: OMScriptableObject::doitTwice (void)

49   void OMScriptableObject::do itTwice (void)
50   {
51      addProp (new OMProp ("name1"));
52      addProp (new OMProp ("name2"));          617
53   }

43   void OMScriptableObject::addProp (const OMSop  newProp)
44   {              623      627
45      delete (*list = list->first((ivMethod) O, newProp->theName))
46      *list += newProp;
47   }
```

620

610

```
Warning 5: freeing pointer to already-freed memory 'this->head->next'
    Location: C:/ My Progs/Src/jdp.cpp(52)
    Function: OMScriptableObject::doitTwice (void)

49   void OMScriptableObject::do itTwice (void)
50   {
51       addProp (new OMProp ("name1"));   617
52       addProp (new OMProp ("name2"));

43   void OMScriptableObject::addProp (const OMSop newProp)
44   {       623
45       delete (*list -= list->first((vvMethod) 0, newProp->theName))

198  OMProp* OMList::first (bpcMethod method, const void* param
199  {
          ...
200      return    findFirst (bpcMethodType,0,method,0,param);

298  OMLIST :: findFirst (OMListFindMethodSelector selector,
                          bvcMethod bvcm,
                          bpcMethod bpcm,
                          sbvipMethod sbvipm,
                          const void* param)
299  {
                 != 0
299      if    (number) {
300              OMListElement* p = head;
301              OMProp* it;
                 != 0
302              while (p) {
303                  it = p->self;       643
304                  Boolean yes = random()
                     != 0
305                  if (yes)
306                      return it;                           640
         ...
201  }                                                        630
46        *list + = newProp;
47   }                                                        620
53   }                                                        610
```

Fig. 6c

Warning 5: freeing pointer to already-freed memory 'this->head->next'
    Location: C:/ My Progs/Src/jdp.cpp (52)
    Function: OMScriptableObject :: doitTwice (void)

```
49  void OMScriptableObject::do itTwice (void)
50  {
51      addProp (new OMProp ("name1")) ;   617
52      addProp (new OMProp ("name2")) ;
43  void OMScriptableObject::addProp (const OMSop newProp)
44  {                                            627
45      delete (*list -= list->first((wMethod) O, newProp->theName))
400 OMProp* OMList::operator-=(const OMProp* it)
401 {
402     OMListLocator caret (*this);
403     caret.setTo (it) ;
404     return caret.detach();
450 OMProp* OMListLocator::detach()
451
452     OMProp* p;
453     !=O
454     if (now)
455     {
456         p = now->self;
457         ...
458         OMListElement* victim = now;
459         ...
460         delete victim;  — 663                        660
405 }                                                    650
46  * list += newProp;
47  }                                                    620
53  }
                                                         610
```

Fig. 6d

Warning 5: freeing pointer to already-freed memory 'this->head->next'
   Location: C:/ My Progs/Src/jdp.cpp(52)
   Function: OMScriptableObject :: doitTwice (void)

```
49  void OMScriptableObject :: do itTwice (void)
50  {
51      addProp (new OMProp ("name1"));
52      addProp (new OMProp ("name2"));
 43  void OMScriptableObject::addProp (const OMSop newProp)
 44  {
 45      delete (*list -= list->first((vvMethod) 0, newProp->theName))
    198  OMProp* OMList :: first (bcpMethod, const void* param)
    199  {
    200      return findFirst (bpcMethodType,0,method,0,param);
    298  OMLIST :: findFirst (OMListFindMethodSelector selector,
                  bvcMethod bvcm,
                  bpcMethod bpcm,
                  sbvipMethod sbvipm,
                  const void param)
    299  {             != 0
    299      if  (number) {
    300          OMListElement* p = head;
    301          OMProp* it;
                       != 0
    302          while (p) {
    303              it = p->self;
    304              Boolean yes = random();
                           != 0
    305              if (yes)
    306                  return it;           640
                  ...
    201  }                                    630
``` part 1

Fig. 6e part 2

```
400  OMProp* OMList::operator-=(const OMProp* it)
401  {
402    OMListLocator caret (*this);
403    caret.setTo (it) ;
404    return caret./detach();
450    OMProp* OMListLocator::detach()
451
452         OMProp* p;
453            !=0
454      if (now)
455    {
456          p = now->self;
457       ...
458          OMListElement* victim = now;
459       ...
460          delete victim;                660
405  }                                              650
46    * list += newProp;                           620
46  }
53  }                                              610
```

Fig. 6e

METHOD AND APPARATUS FOR DISPLAYING COMPUTER PROGRAM ERRORS AS HYPERTEXT

REFERENCE TO RELATED APPLICATIONS

Reference is made to U.S. Pat. No. 5,694,539 to Haley et al. and in U.S. Pat. No. 5,790,778 to Bush et al., both of which are herein incorporated by reference.

FIELD OF THE INVENTION

The present invention relates to displaying computer program errors as hypertext in a computer system.

BACKGROUND

Hypertext is a term used to describe a particular organization of information within a computer system and its presentation to a user. Hypertext exploits the computer's ability to link together information from a wide variety of sources to provide the user with the ability to explore a particular topic. The traditional style of presentation used in books employs an organization of the information that is imposed upon it by limitations of the medium, namely fixed sized, sequential paper pages. Hypertext systems, however, use a large number of units of text or other types of data such as image information, graphical information, video information or sound information, which can vary in size. A collection of such units of information is termed a hypertext document. Sometimes hypertext documents employing information other than text are termed hypermedia documents.

Each of the different units in a hypertext document is generally self-contained but contains references to other units. The references are made explicit in the form of "links". Each link is a relation between locations in two units of information. When a portion of a unit of information is displayed, links to locations in the displayed portion are indicated on the display to the user. A link can then act as a user-activated control. A user can act on a displayed link, either by clicking on it with a mouse to cause the particular unit that is the link target to be displayed. Typically, hypertext systems are window-based and the newly displayed unit appears in a new window. The new unit may, of course, contain further links that can be similarly activated to display other units of information. By following links the user may "navigate" around the document. The user has a great deal of control over the order in which information is presented and can play a very active role in selecting what is of interest and how far to pursue a given topic.

In one prior art method of hypertext display the contents of a link are displayed not in a new page but in a region in the middle of the present page, right below the link. If the contents of the link has in turn its own links, their contents can be displayed within a smaller sub-region, so that the nested displays produce a "boxes within boxes" appearance, with each box visually adjacent to the link which invoked it.

A tremendous amount of cost and effort is spent discovering and analyzing errors in computer programs. Computer programs are typically written as collections of functions which call other functions, and programmers seeking to understand or debug those programs have a need to visualize the nested structure of the program, while keeping the display of the called function visually adjacent to its point of its invocation in the calling function. Standard methods of hypertext display do not provide such a visualization.

SUMMARY OF THE INVENTION

A control-flow path of computer program execution errors is displayed as a hypertext region. A first program function lying on the error's control-flow path is displayed as a hypertext document in a first region on the display. Subsequently, a first hypertext link marker located within the first function, corresponding to a second function on the error path (as called by the first function) is selected. Thereafter, the text of the second function associated with the first link marker is displayed in a second region. The second region is positioned in the first region such that the text of the first function is not obscured. The second region includes a first tab area that surrounds the first link marker after it is selected.

The method may also include selecting a second hypertext link marker located within the second function, associated with a third function called by it on the error path. Afterwards, the text of the third function associated with the second link marker is displayed in a third region. The third region is positioned in the second region such that the text of the second function is not obscured.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 1*a* illustrates a prior art-exemplary hypertext system implemented in a program simulation and error checking application;

FIG. 6*a* illustrates one embodiment of a display screen in a hypertext system configured to perform a computer program simulation and error detection application;

FIG. 6*b* illustrates one embodiment of a display screen in a hypertext system configured to perform a computer program simulation and error detection application;

FIG. 6*c* illustrates one embodiment of a display screen in a hypertext system configured to perform a computer program simulation and error detection application;

FIG. 6*d* illustrates one embodiment of a display screen in a hypertext system configured to perform a computer program simulation and error detection application;

FIG. 6*e* illustrates one embodiment of a display screen in a hypertext system configured to perform a computer program simulation and error detection application;

DETAILED DESCRIPTION

FIG. 1*a* is a prior art diagram of a computer display including a window 10. Window 10 illustrates the results of errors detected upon executing a computer program simulation. The display window indicates that the simulation detected an error in a function link called "doitTwice." In addition, each line of the "doitTwice" function is shown in window 10. The "doitTwice" function includes statement lines that reference other functions. For example, the functions "addProp" and "OmProp" are both referenced in statement lines 51 and 52. However, the "addProp" and "OmProp" references are shaded in statement line 52. The shaded function names indicate that the detected error occurred in a flow control path of at least one of the functions as they were referenced in statement line 52. The functions shaded in statement line 52 are commonly referred to as link markers. A link marker is a visual indication to the system user that there may be one or more links at a particular point in a document.

Figure 1B:
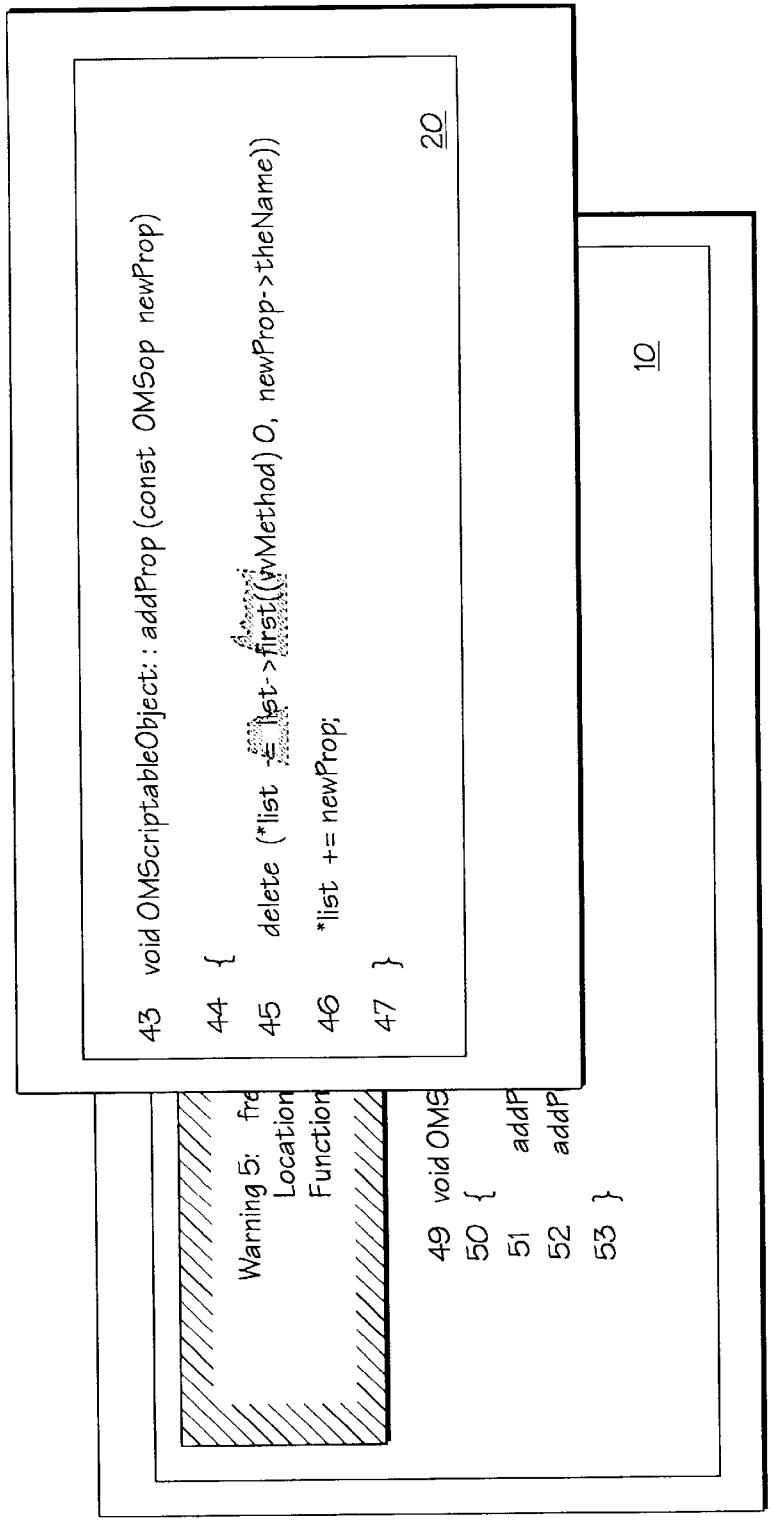
FIG. 1*b* illustrates a prior art-exemplary hypertext system implemented in a program simulation and error checking application.

FIG. 1b is a diagram of a prior art display with a window 20 tiled over window 10. Window 20 includes a listing of the "addProp" function. The "addProp" function link is displayed in response to the user selecting the shadowed "addProp" link marker on statement line 52 of the "doitTwice" function link. Statement line 45 of the "addProp" link includes subsequent shaded link markers referencing the "-=" function and the "first" function links. As described above, the link markers indicate that the detected error may have occurred in either the "-=" or "first" links.

Figure 1C:
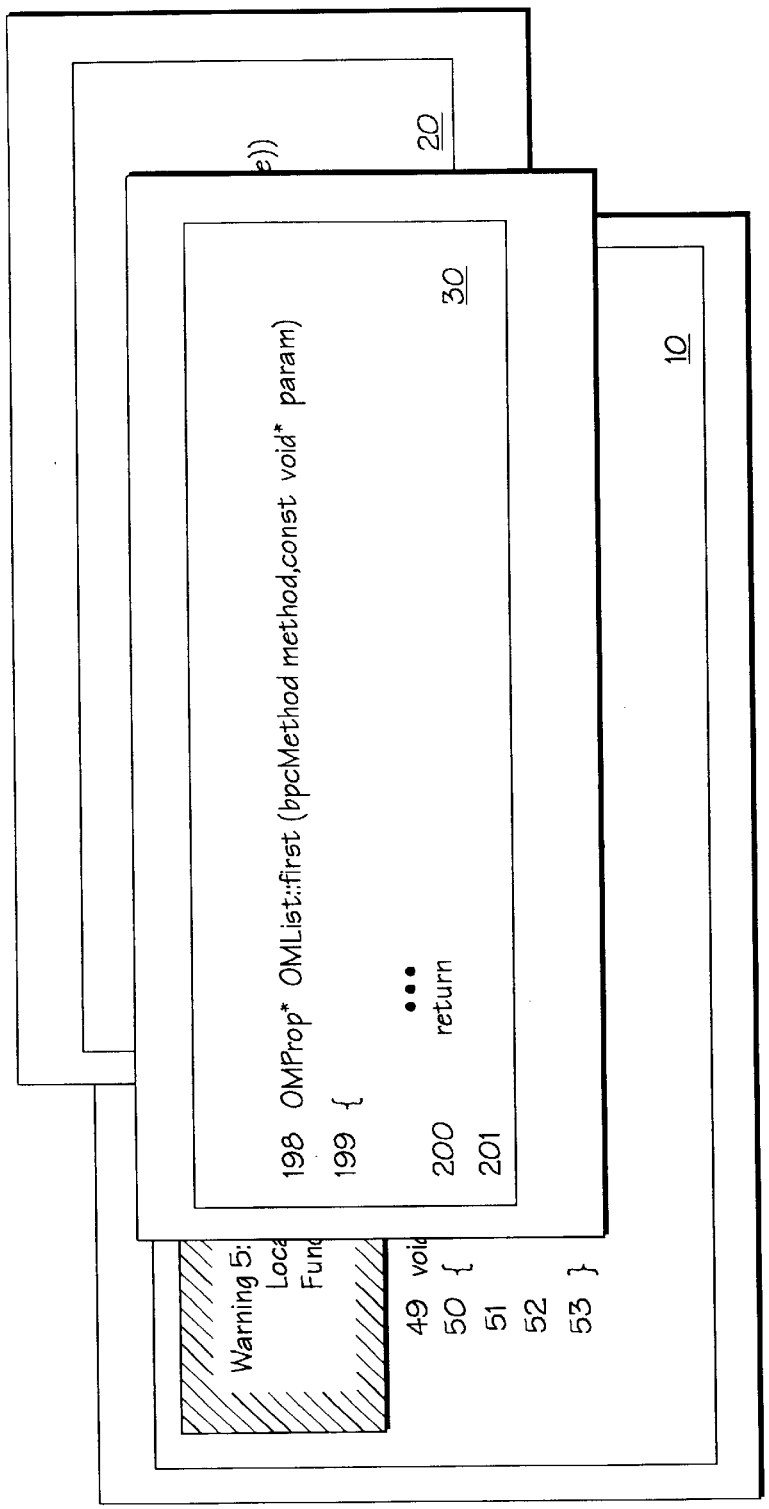
FIG. 1*c* illustrates an-exemplary prior art hypertext system implemented in a program simulation and error checking application.

FIG. 1c is a diagram a prior art display with a window 30 tiled over windows 10 and 20. Similarly, window 30 includes a listing of the "first" function link. The "first" function link is displayed in response to the user selecting the "first" link marker on statement line 45 of the "addProp" link.

Figure 2A:
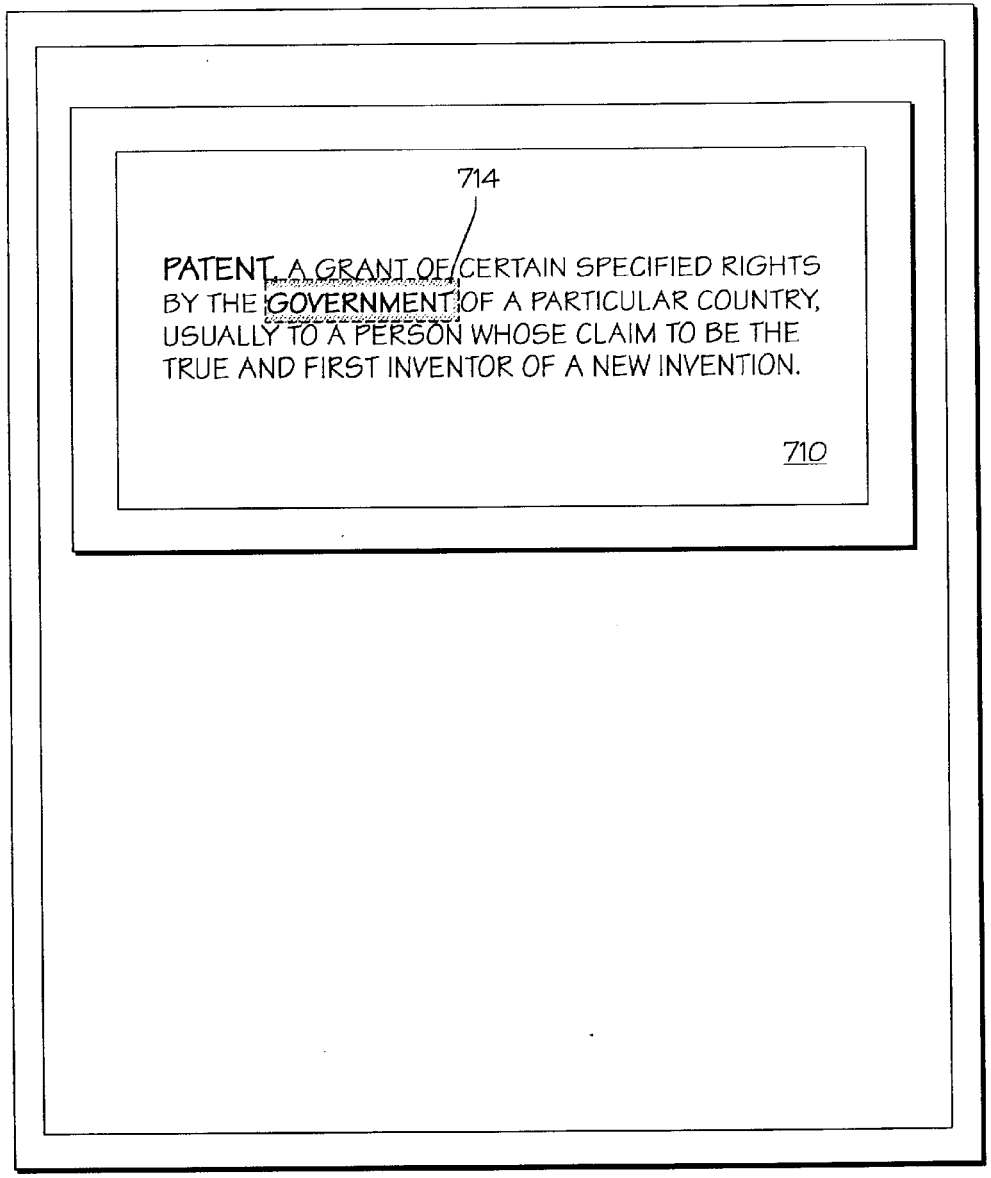
FIG. 2*a* illustrates a prior art-exemplary hypertext system configured to perform a database application.
Figure 2B:
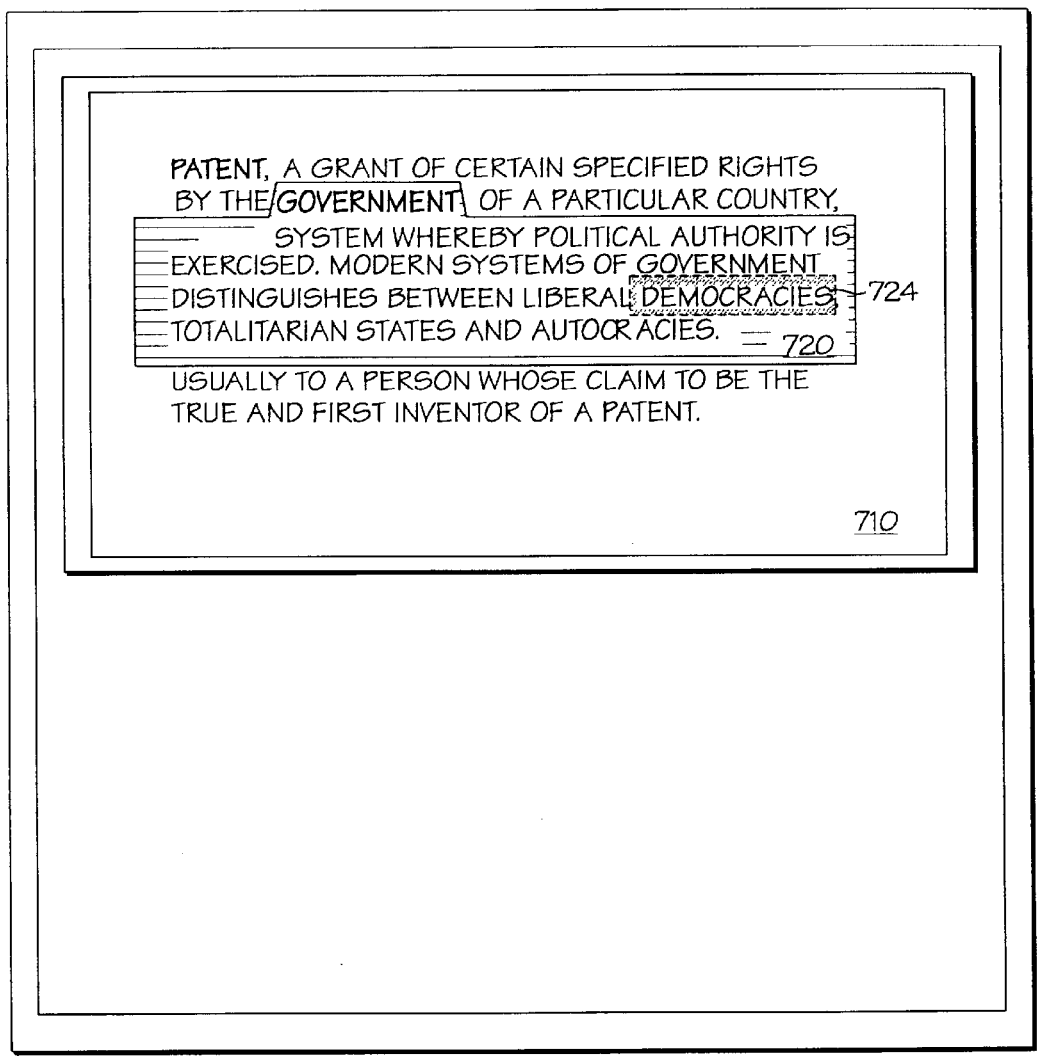
FIG. 2*b* illustrates a prior art-exemplary hypertext system 10 configured to perform a database application.
Figure 2C:
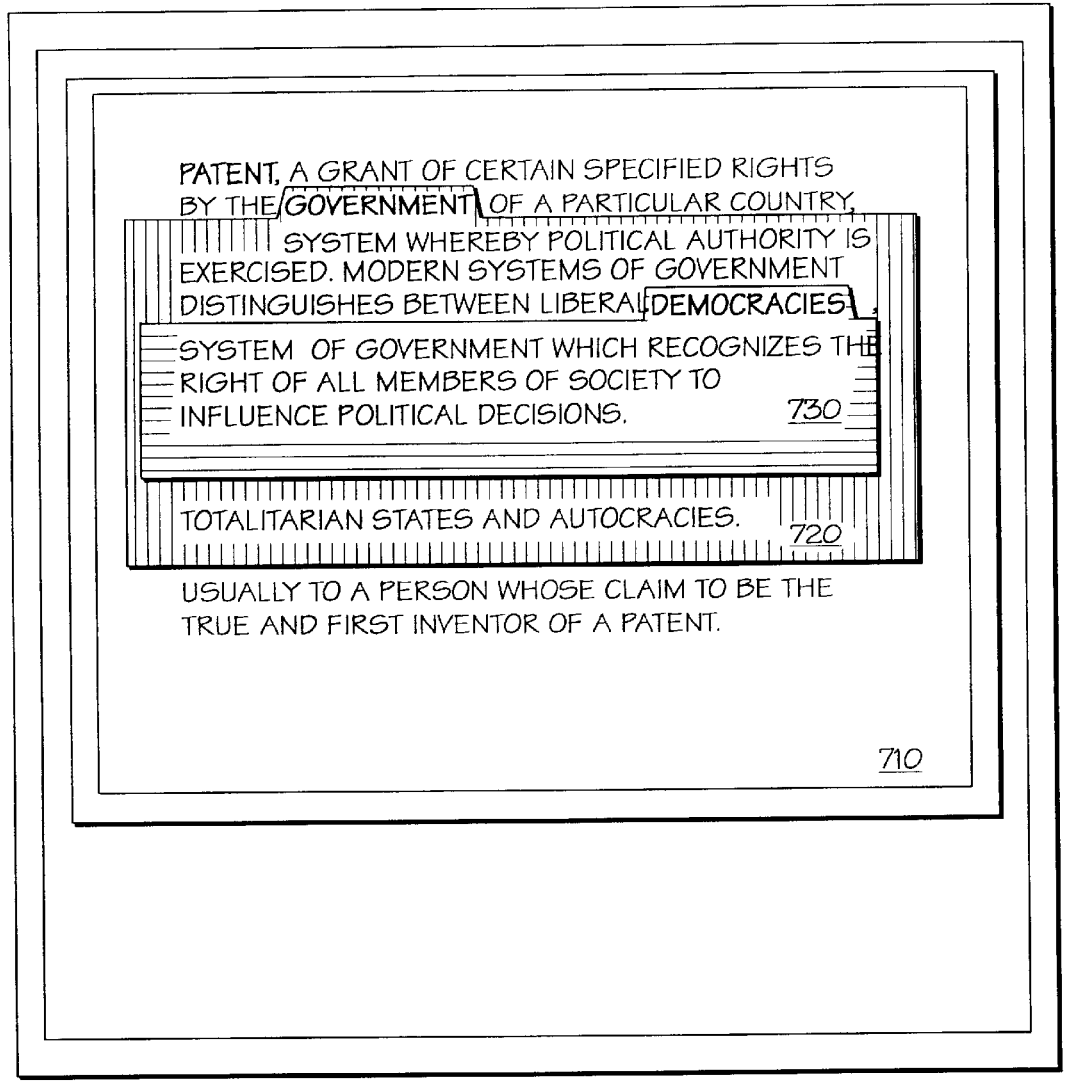
FIG. 2*c* illustrates a prior art-exemplary hypertext system configured to perform a database application.

FIGS. 2a–2c illustrate a prior art hypertext system wherein computer system 310 performs a database application. FIG. 2a is a prior art diagram screen 316 including a window 710. Included within window 710 is a database document link for the definition of the word "patent". The patent document includes a link marker 714 that represents a link to another document in the database entitled "government" at this particular location in screen 316. The user may select link marker 714 in order to view the government document link.

FIG. 2b illustrates a prior art display of screen 316 after selecting link 15 marker 714. Screen 316 includes a window 720 located within window 710. Window 720 includes the text for the government document link. The lines of text of window 720 begins on the line below the preselected position of link marker 714. The lines of text in window 710 that were originally located below link marker 714 are displaced to below window 720.

Additionally, window 720 is shaded with color 506 in order to provide a contrast with window 710. Window 720 also includes a tab area that surrounds the link name (government) where link marker 714 had previously been positioned. The location of window 720 allows a user to read the government document within the context of the patent document without having to toggle back and forth. Further, window 720 includes a link marker 724 that references a document called "democracies". The user may select link marker 724 using mouse 313.

FIG. 2c illustrates a prior art display of screen 316 after selecting link marker 724. Screen 316 includes a window 730 shaded with color 510 and positioned inside of window 720. Window 720 remains positioned inside window 710. Window 730 includes the text for the democracies link document. The lines of text of window 730 begins on the line below the preselected position of link marker 724. The lines of text in window 720 that were located below link marker 724 are shifted to below window 730. Window 730 also includes a tab area that surrounds the link name (democracies) where link marker 714 had previously been positioned. The location of window 730 allows a user to read the democracies document within the context of the patent and government documents.

Figure 3:
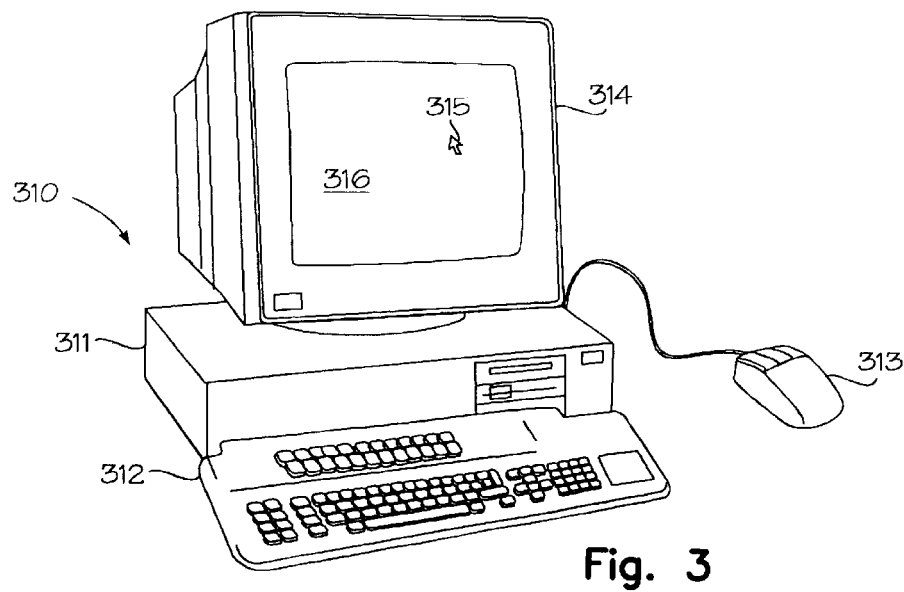
FIG. 3 is a diagram of one embodiment of a computer.

FIG. 3 is a diagram of one embodiment of a computer 310. Computer 310 includes a system unit 311, a keyboard 312, a mouse 313 and a graphics display device (or monitor) 314. Keyboard 312 and mouse 313 are user input devices, and display device 314 is a user output device. Mouse 313 is used to control a cursor 315 displayed on the screen 316 of display device 314. The Graphic User Interface (GUI) supported by computer 310 allows the user to "point-and-shoot" by moving cursor 315 to a specific location on screen 316 and pressing (or clicking) either a left or a right button on mouse 313 in order to perform a command or selection.

Figure 4:
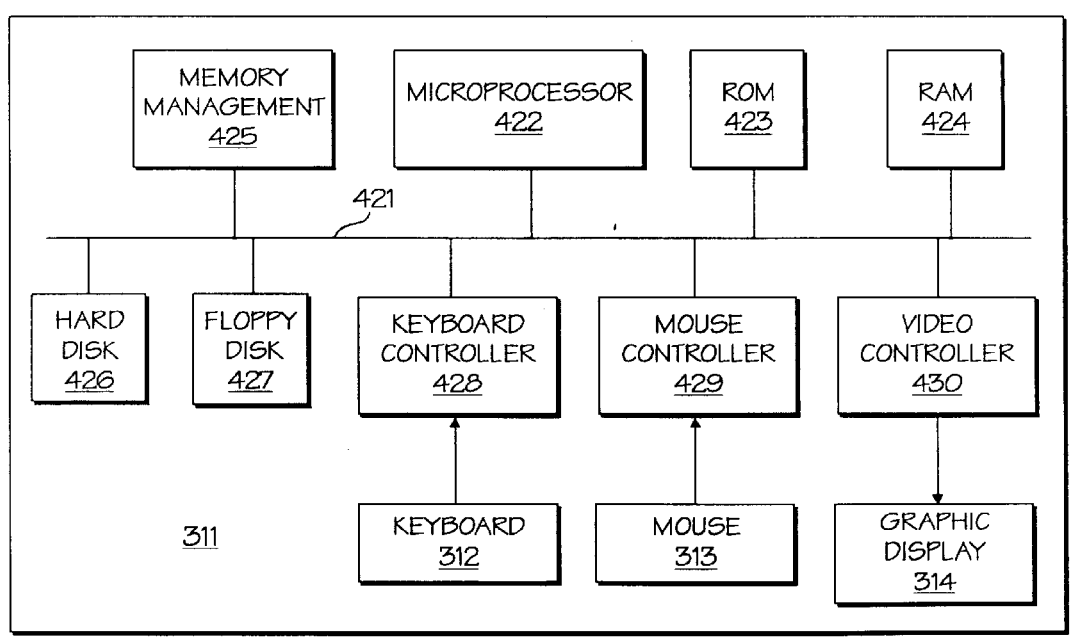
FIG. 4 is a block diagram of one embodiment of a system unit.

FIG. 4 is one embodiment of a block diagram of system unit 311. System unit 311 includes a system bus 421 to which the various components within system unit 311 are coupled. A microprocessor 422 is connected to the system bus 421 and is supported by Read Only Memory (ROM) 423 and Random Access Memory (RAM) 424, also connected to system bus 421. ROM 423 contains, among other code, the Basic Input/Output System (BIOS) code which controls basic hardware. RAM 424 is the main memory into which software, such as an operating system and application programs are loaded. It is a computer readable medium from which such software runs on microprocessor 422. Other forms of computer readable medium include different levels of cache memory, carrier waves on which instructions comprising the software are transmitted between elements of the computer and between different computers, and slower secondary storage devices. A memory management chip 425 is connected to the system bus 421 and controls Direct Memory Access (DMA) operations, including paging data between RAM 424, a hard disk drive 426 and a floppy disk drive 427. Further, system unit 311 includes a keyboard controller 428, a mouse controller 429 and a video controller 430, all coupled to system bus 421. As implied, keyboard controller 428 provides the hardware interface for keyboard 312, mouse controller 429 provides the hardware interface for mouse 313, and video controller 430 provides the hardware interface for graphic display device 314. One of ordinary skill in the art will appreciate that computer 310 may include other peripherals (e.g., optical storage media, audio 110, printers, etc.). In addition, computer 310 may include a network interface module for communications with other computer systems.

According to one embodiment, computer system 310 may operate as a hypertext system. Computer system 310 may be configured to link together hypertext (or hypermedia) documents from a wide variety of sources to provide a system user with the ability to explore a particular topic. Each hypertext document is generally self-contained, but contains references to other hypertext documents in the form of "links". Each link is a relation between the locations of two units of information. When a portion of a unit of information is displayed, links to locations in the displayed portion are indicated on screen 316 to the user. A link may perform as a user-activated control. Further, a user may select a displayed link, either by clicking on the link with mouse 313 or by using keyboard 312, causing the particular document that is the link target to be displayed.

Figure 5:
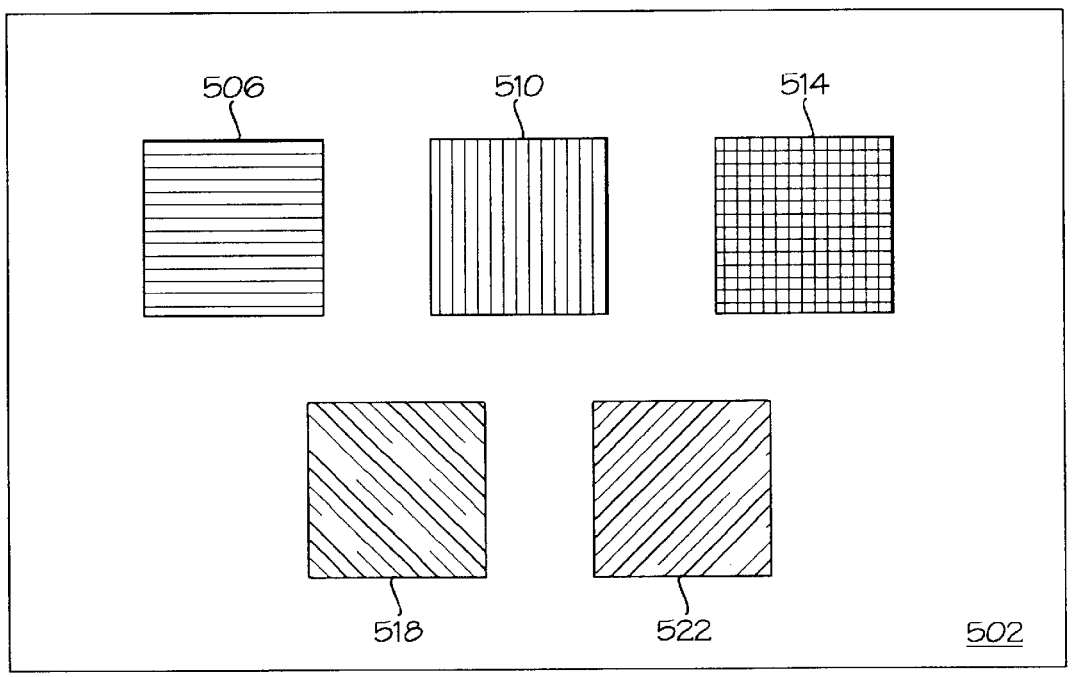
FIG. 5 illustrates one embodiment of a legend of colors.

FIG. 5 is one embodiment of a legend 502 of colors that may be used for color coding purposes. Legend 502 includes colors 506, 510, 514, 518, and 522. Colors 506, 510, 514, 518, and 522 are preferably yellow, green, orange, blue, and magenta, respectively. However, other colors, as well as other combinations, may alternatively be used. Additionally, colors 506, 510, 514, 518, and 522 may represent different patterns and/or fonts in addition to or instead of colors. This is especially useful when display device 314 comprises a black and white screen 316. Alternatively, the colors/patterns/fonts may be user definable.

FIGS. 6a–6e illustrate one embodiment of an error-display system wherein computer system 310 performs simulating execution of a computer program to detect programming errors in the computer program. As a computer program is simulated, links are generated between the functions in each executed flow control path. In addition, link markers are added for each link between functions in a flow control path where a programming error was detected. Nevertheless, the simulation/error detection application is not described in further detail in order not to unnecessarily obscure the present invention. The simulation and error detection application performed by computer system 310 operates according to a protocol described in U.S. Pat. No. 5,694,539 to Haley et al. and in U.S. Pat. No. 5,790,778 to Bush et al., both of which are herein incorporated by reference. Other methods of simulation and error detection which may also be used.

FIG. 6a is a diagram of one embodiment of screen 316 including a window 610. Included within window 610 is the results of a programing error detected upon executing a computer program simulation. The results in window 610 indicates that the simulation detected a programming error in a function link called "doitTwice". In addition, each statement line of the "doitTwice" function link is shown in window 610. The "doitTwice" function includes references to other function links. For example, the functions "addProp" and "OmProp are referenced in both statement lines 51 and 52. Window 610 includes link marker 613 and link marker 617 at statement line 52.

Link markers 613 and 617 indicate that the detected error occurred in the path of either the "addProp" function or the "OmProp" function as they were referenced in line 52. Link markers 613 and 617 are positioned within a shaded box in order to provide a visual indication to the system user that there are links to the "addProp" and "OmProp" functions at this particular location in screen 316. Alternatively, link markers may be displayed using other methods (e.g., underline, bold font, etc.,). The user may select either link marker 613 or link marker 617 using mouse 313 in order to view the respective functions.

According to one embodiment, a user may select a link marker by clicking on either the left or right button on mouse 313. By clicking on a link marker once with the left button, the display state of the respective link marker is changed. For example, if a link is closed, left-clicking on the respective link marker opens the link. Similarly, if the link is open, left-clicking on the link marker closes the link. Therefore, a user may toggle between the opened and closed states of a link each time the respective link marker is selected with a left click of mouse 313. Links may also be closed in further embodiments by providing a close icon such as an "X", or by pressing an escape key or other desired key on keyboard 312.

Alternatively, selecting a link by right-clicking mouse 313 on the respective link marker shows the current display style of the particular link. According to one embodiment, a pop-up menu is displayed when a link is selected by clicking on the right button on mouse 313. In one embodiment, the menu displays the number of lines of text to be included within the link. For instance, a user-selectable number of lines of text to be displayed in the link may be included within the menu. A user may choose to display all, several lines or one line of the text within a link. Additionally, other display options may be included within the window. Further, one of ordinary skill in the art will appreciate that the functionality of the left and right buttons of mouse 313 may be reversed.

FIG. 6b is a diagram of one embodiment of screen 316 after selecting link marker 613 to be opened. Screen 316 includes a window 620 located within window 610. The statement lines included in window 620 begin just below the preselected position of link marker 613 on statement line 52 of the "doitTwice" function link. The statement lines of the "doitTwice" link within window 610 that were originally located on the line below link marker 613. (e.g., line 53) are displaced to below window 620. Additionally, window 620 is shaded with color 506 in order to provide a contrast with window 610. Window 620 also includes a tab area that surrounds the link name (addProp) at the previous location of link marker 613. The location of window 620 allows a user to analyze the instructions of the "doitTwice" and "add Prop" functions in the order they were actually executed during the simulation. For example, after selecting link marker 613, the user may examine the "addProp" function link with reference to how it was called in the "doitTwice" function. In addition, the configuration of window 620 with respect to window 610 enables the user to examine both the "addProp" and "doitTwice" links simultaneously without having to toggle between the two functions. Window 620 includes link markers 623 and 627 at statement line 52 of the "addProp" function. Link marker 623 references a function link called "-=" and link marker 627 references a function link called "first". As described above, link markers 623 and 627 indicate that the detected programming error may have occurred in either the or "first" functions as they were referenced by the "addProp" function in statement line 45. The user may select either link marker 623 or link marker 627 using mouse 313 in order to view their respective links.

FIG. 6c is a diagram of one embodiment of screen 316 after selecting link marker 627. Screen 316 includes a window 630 located within window 620. Window 620 remains positioned within window 610. The statement lines included within window 630 begin just below the preselected position of link marker 627 on statement line 45 of the "addProp" link. The statement lines of the "addProp" link within window 620 that were located below link marker 627 (e.g., lines 46 and 47) are displaced to below window 630.

Further, window 630 is shaded with color 510 in order to provide a contrast with window 620. Window 630 also includes a tab area that surrounds the link name (first) where link marker 627 had been located. The location of window 630 allows a user to analyze the instruction path of the "doitTwice", "addProp" and "first" functions in the order they were actually executed during the simulation. For instance, after selecting link marker 627, the user may examine the "first" function with reference to how it was called in the "addProp" function, which was called by the "doitTwice" function. In addition, screen 316 includes a window 640 located within window 630. Window 640 is opened as a result of selecting a link marker for a function link labeled "findFirst" on statement line 200 in window 630. The configuration of window 640 with reference to window 630 is the same as described above with respect to the relationship between windows 630 and 620, and windows 620 and 610. Moreover, window 640 is shaded with color 514 and includes a link marker 643. The configuration of windows 610–640 enables the user to examine the execution path of the "doitTwice" "addProp", "first" and "findFirst" functions simultaneously.

FIG. 6d is a diagram of one embodiment of screen 316 after selecting link marker 623. Screen 316 includes a window 650 shaded with color 518 positioned within window 620. The statement lines included within window 650 begin just below the preselected position of link marker 623. The statement lines of the function link within window 620 that were located below link marker 623 are displaced to below window 650. Window 650 also includes a tab area that surrounds the link name (-=) where link marker 623 was previously positioned. The location of window 650 allows a user to analyze the flow control path of the "doitTwice", "addProp" and "-=" functions in the order they were actually executed during the simulation.

Further, screen 316 includes a window 660 shaded with color 514 located within window 650. Window 660 is opened as a result of selecting a link marker for a function link labeled "detach" on line 404 in window 650. The configuration of window 660 with reference to window 650 is the same as previously described with respect to the relationship between windows 630 and 620, windows 620 and 610, etc. Furthermore, window 660 includes an error line 663 at instruction line 460. Error line 663 indicates that the programming error originally detected in the "doitTwice" function is located in the "detach" function. According to one embodiment, error line 663 may be highlighted with a bolded font. Additionally, error line 663 may be highlighted with colors 506, 510, 514, 518 or 522. The configuration of windows 610, 620, 650 and 660 enables the user to find error line 663 by examining the execution path of the "doitTwice" "addProp", and "detach" functions simultaneously.

FIG. 6e is a diagram of one embodiment of screen 316 after selecting both link marker 623 and link marker 627. Note that FIG. 6e is divided into part 1 and part 2 on separate sheets of drawings. This was done to simulate a standard hypertext display system where a page of text may be much longer than the size of a display or screen. Standard scrolling functions are used to move to different portions of the text. Screen 316 includes the window 630/640 combination as described with reference to FIG. 6c, as well as the window 650/660 combination described with reference to FIG. 6d. Window 640 is positioned within window 630, and window 660 is positioned within window 650. Both window 630 and window 650 are positioned within window 620. Window 620 is positioned within window 610.

Windows 620–660 are shaded with colors 506, 510, 522, 518, and 514, respectively. The organization of the windows on screen 613, upon user selection of multiple link markers in a given function, is determined by the order in which each respective function is executed during the program simulation. For example, the "first" link window is displayed immediately below line 45 of window 620 because it is the first link marker function executed in window 620 during the simulation. The function windows associated with other selected link markers in a function are displayed below the earlier executed functions. For instance, the "-=" link window 650 is positioned below window 630. Note that the tab area of window 650 extends up to the function name of the "-=" link at the location link marker 623 had previously been positioned. The configuration of windows 610–660 enables the user to find error line 663 by examining the entire execution path of the "doitTwice" function at once.

Figure 7:
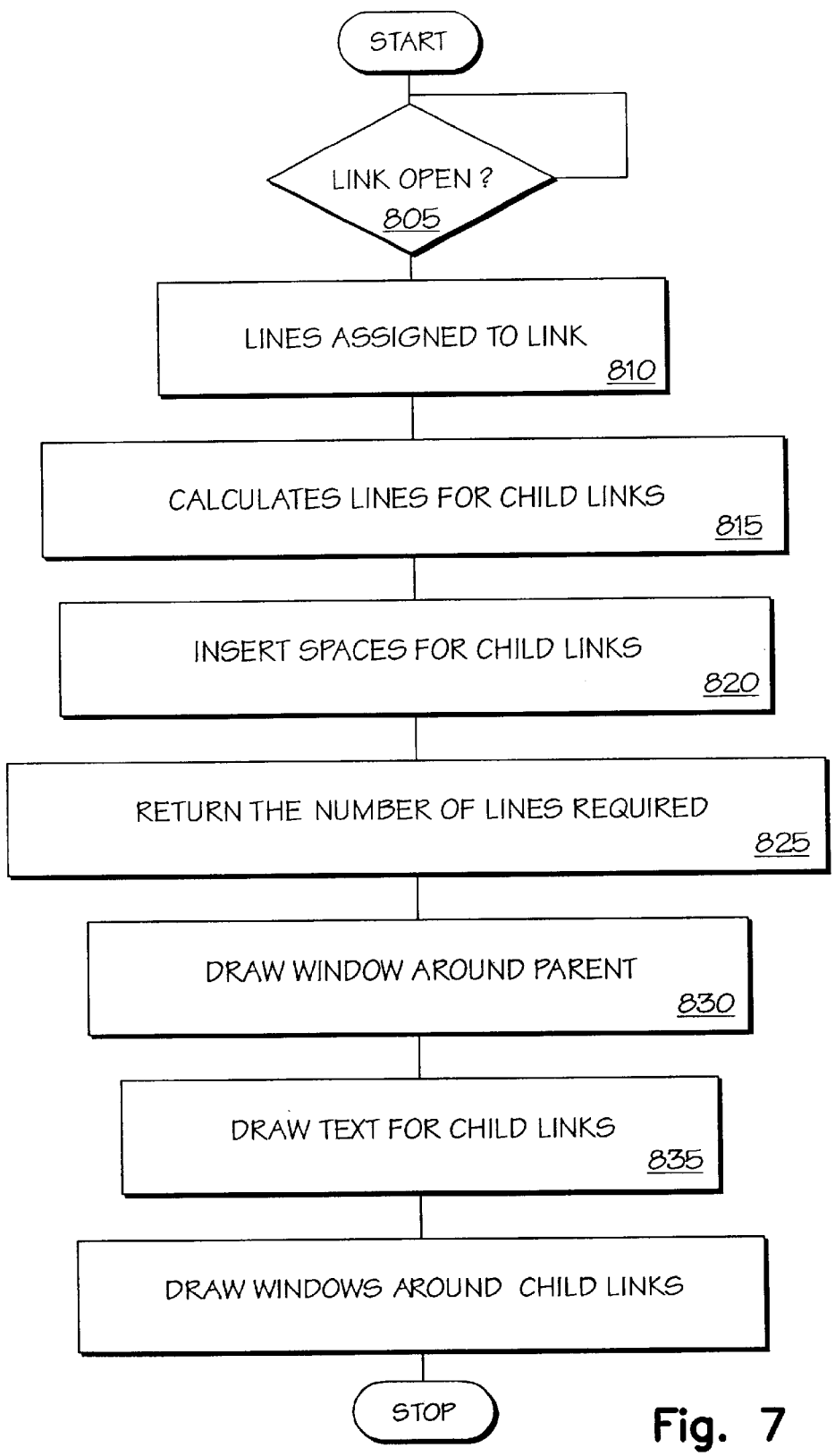
FIG. 7 is a flow diagram for one embodiment of the operation of a computer system performing as a hypertext system.

FIG. 7 is a flow diagram of one embodiment of the operation of computer 20, system 310 performing as a error-display hypertext system. At process block 805 it is determined whether the link is opened. If the link is closed, no lines are required for display at screen 316. If the link is opened, lines are assigned to the link based upon the number of lines of text to be displayed in the window for the link, process block 810. Using the database application described above with respect to FIGS. 2a–2c as an example, the patent link includes four lines that are displayed in window 710.

At process block 815, the number of lines of text for each opened link within a parent link (or child links) is calculated. Referring to FIG. 2c as an example, the government link includes four lines of text and the democracies link includes three lines of text. Note that this calculation is also carried out for all opened child links (e.g., child links within child links). At process block 820, a number of spaces corresponding to the number of lines of text for each open child link is inserted in the applicable locations. For example, seven spaces are inserted between the second and fourth lines of the patent link.

At process block 825, the total number of lines that are required by the parent link (including the child links) is stored. At process block 830, the window is drawn around the parent link. At process block 835, the blank spaces of the parent link is filled in with the text for each child link. At process block 840, the window is drawn around each open child link. As described above, the window for each child link encircles the link marker of its parent link, forming the tab. According to one embodiment, if two link markers are located on the same line of a parent link, their respective links are displayed in the order in which the link markers appear in the parent link.

CONCLUSION

Thus, a method and system of simultaneously displaying a computer program's error-path as linked hypertext documents has been described. The method may be implemented in computer executable instructions which may be stored on a computer readable medium such as a magnetic disk, CD, read only memory, random access memory, carrier wave for transmission or other medium from which the instructions may be read by a computer. The instructions may be written in a high level language and translated, compiled or interpreted as desired. A computer system is then used to implement the program. Further, circuitry may be used to accomplish the same functions as the computer executable instructions, such as through use of a programmable logic array.

The method and system allow analysis of an instruction path in the order that the instructions were executed. Nested windows are used to provide a view of flow of a program or database. Text is displaced, but not necessarily obscured with each nested window added. A tab on a nested window shows the link that was used to obtain the nested window. By use of the tab, the nested window is clearly visually associated with the link, and the text in which the link occurred on the same line as the link is visible without displacement. The invention is of great benefit in providing visualization of paths.

What is claimed is:

1. A method of displaying a control-flow path leading to a computer program's error as linked hypertext regions in a computer system having a display, the method comprising:

displaying a first function in the error's control-flow path as a hypertext document in a first region within the display;

selecting a first hypertext link marker located within the first function, associated with a second function called by the first function which also lies on the error's control-flow path;

displaying the second function as a hypertext document associated with the first link marker in a second region without obscuring the text of the first document, wherein displaying the second function comprises:

inserting the second function's text below the position of the first link marker; and displacing the text of the first function originally positioned below the first link marker to below the second region, wherein the second region includes a first tab area that surrounds the first link marker;

selecting a second hypertext link marker located within the first function, corresponding to a second function called by the first function and also lying on the error's control-flow path; and determining whether the second link marker is located on the same line of text of the first function as the first link marker, and if not, displaying a third function as hypertext associated with the second link marker in a third region without obscuring the text of the first and second functions.

2. The method of claim 1 further comprising:

determining whether the execution of the third function in the error's control-flow path occurs before the execution of the second function;

if the second link marker is located on the same line of text of the first document as the first link marker; inserting the third region below the position of the second link marker;

displacing the second region from below the first link marker to below the third region; and displacing the text of the first document to below the second region.

3. The method of claim 2 further comprising:

inserting the third region below the second region if it is determined that the second link marker is located after the first link marker on the same line of text of the first function; and displacing the text of the first function from below the second region to below the third region.

4. A method of displaying a control-flow path leading to a computer program's error as linked hypertext regions in a computer system having a display, the method comprising:

displaying a first function in the error's control-flow path as a hypertext document in a first region within the display;

selecting a first hypertext link marker located within the first function, associated with a second function called by the first function which also lies on the error's control-flow path;

displaying the second function as a hypertext document associated with the first link marker in a second region without obscuring the text of the first document, wherein the second region includes a first tab area that surrounds the first link marker;

selecting a second hypertext link marker located within the second function and associated with a third function called by the first and lying on the program error's control-flow path; and displaying the third function as hypertext associated with the second link marker in a third region without obscuring the text of the second function, wherein the number of lines of text displayed within the second function is configured by accessing the first link marker, and the number of lines of text displayed within the third function is configured by accessing the third link marker.

5. The method of claim 4 wherein the first region is shaded with a first pattern, the second region is shaded with a second pattern and the third region is shaded with a third pattern.

6. The method of claim 4 wherein the first region is shaded with a first color, the second region is shaded with a second color and the third region is shaded with a third color.

7. The method of claim 4 wherein the third region includes a second tab area that surrounds the second link marker after it is selected.

8. The method of claim 4 wherein the first and second link markers are positioned within a shaded box.

9. The method of claim 4 wherein the first and second link markers are underlined.

10. A method of displaying a control-flow path leading to a computer program's error as linked hypertext regions in a computer system having a display, the method comprising:

displaying a first function in the error's control-flow path as a hypertext document in a first region within the display;

selecting a first hypertext link marker located within the first function, associated with a second function called by the first function which also lies on the error's control-flow path;

displaying the second function as a hypertext document associated with the first link marker in a second region without obscuring the text of the first document, wherein the second region includes a first tab area that surrounds the first link marker; and closing the second function's display by selecting the first link marker while the second function is displayed.

11. A method of displaying the results of simulating execution of a computer program to detect programming errors in the computer program, the method comprising:

displaying a first function of the simulated error's control-flow path in a first region of a computer display screen;

selecting a first hypertext link marker located on a first statement line of the first function, corresponding to a second function also lying on the simulated error's control-flow path; and displaying the second function of the computer program associated with the first link marker in a second region without obscuring the statement lines of the first function, wherein displaying the second function comprises:

inserting the second region below the first statement line of the first function; and displacing the remaining statement lines of the first function from the line below the first statement line to below the second region;

selecting a second hypertext link marker on the first statement line of the first function;

determining whether the second function is executed in the computer program before a third function associated with the second link marker;

if not, inserting the text of the third function in a third region, wherein the third region is inserted below the first statement line of the first function;

displacing the second region from below the first statement line of the first function to below the third region; and displacing the remaining statement lines of the first function to below the second region.

12. A method of displaying the results of simulating execution of a computer program to detect programming errors in the computer program, the method comprising:

displaying a first function of the simulated error's control-flow path in a first region of a computer display screen;

selecting a first hypertext link marker located on a first statement line of the first function, corresponding to a second function also lying on the simulated error's control-flow path;

displaying the second function of the computer program associated with the first link marker in a second region without obscuring the statement lines of the first function;

selecting a second hypertext link marker located on a first line of the second function; and displaying a third hypertext document associated with the second link marker within a third region without obscuring the statement lines of the second function, wherein the first link marker indicates that a programming error has occurred in a control-flow path through the first or second functions, wherein a programming error is displayed on a first statement line of the third function, wherein the first statement line of the third function is displayed in a bold font.

13. The method of claim 12 wherein the first region is shaded with a first color, the second region is shaded with a second color and the third region is shaded with a third color.

14. The method of claim 12 wherein the first and second link markers are positioned within a shaded box.

15. The method of claim 12 wherein the link markers are underlined.

16. The method of claim 12 wherein the second region includes a first tab area that surrounds the first link maker after it is selected, and the third region includes a second tab area that surrounds the second link marker after it is selected.

* * * * *